United States Patent
Guerra

(10) Patent No.: US 6,540,206 B2
(45) Date of Patent: Apr. 1, 2003

(54) BIDIRECTIONAL BALL VALVE PARTICULARLY FOR ECOLOGICAL FRIGORIFIC GASES

(75) Inventor: Daniela Guerra, Milan (IT)

(73) Assignee: Fratelli Guerra KMP Srl, Buccinasco (IT)

( * ) Notice: Subject to any disclaimer, the term of this patent is extended or adjusted under 35 U.S.C. 154(b) by 0 days.

(21) Appl. No.: 09/864,079

(22) Filed: May 23, 2001

(65) Prior Publication Data

US 2002/0008223 A1 Jan. 24, 2002

(30) Foreign Application Priority Data

May 24, 2000 (IT) .......................................... MI00A1149

(51) Int. Cl.⁷ ................................................ F16K 5/06
(52) U.S. Cl. .................. 251/288; 251/315.16; 137/270; 137/556.3; 137/625.32
(58) Field of Search ............................ 251/315.16, 288, 251/315.01, 315.02–315.15; 137/270, 556.3, 556, 625.32, 625.31

(56) References Cited

U.S. PATENT DOCUMENTS

| | | | | |
|---|---|---|---|---|
| 3,333,813 A | * | 8/1967 | Rabe ...................... | 251/315.16 |
| 3,647,178 A | * | 3/1972 | Adams ................... | 251/315.09 |
| 3,674,052 A | * | 7/1972 | Hartman et al. ........ | 251/315.16 |
| 4,177,832 A | * | 12/1979 | Price ...................... | 251/315.14 |
| 4,548,237 A | * | 10/1985 | Bogenschutz ........... | 251/315.16 |
| 4,590,628 A | * | 5/1986 | DeGregorio ............. | 251/315.1 |
| 4,708,158 A | * | 11/1987 | Akamatsu ................ | 251/315.1 |
| 4,741,361 A | * | 5/1988 | McHugh ................. | 251/315.14 |
| 5,064,167 A | * | 11/1991 | DiPalma ................. | 251/315.13 |
| 5,590,680 A | * | 1/1997 | Gugala et al. .......... | 251/315.01 |
| 5,632,294 A | * | 5/1997 | Benton ................... | 251/315.16 |
| 5,785,074 A | * | 7/1998 | Kieper ................... | 251/315.14 |
| 5,944,051 A | | 8/1999 | Johnson | |
| 6,138,715 A | * | 10/2000 | LaLone et al. ......... | 251/315.16 |

FOREIGN PATENT DOCUMENTS

| | | | | |
|---|---|---|---|---|
| DE | 94 01 703 | | 6/1994 | |
| EP | 507716 | * | 3/1992 | ............ 251/316.16 |
| FR | 2538492 | | 6/1984 | |
| GB | 226385 | | 12/1924 | |

* cited by examiner

Primary Examiner—Henry C. Yuen
Assistant Examiner—John Bastianelli
(74) Attorney, Agent, or Firm—Herbert Dubno

(57) ABSTRACT

The present finding relates to a bidirectional ball valve usable particularly for ecological frigorific gases, which has a valve body housing a ball shutter connected to a control rod sealingly protruding from said valve body.

The peculiarity of the finding is in that the ball shutter is turnable by 180° and is provided with a through hole on the side surface, and in the closing step can be arranged in the incoming flow direction.

7 Claims, 3 Drawing Sheets

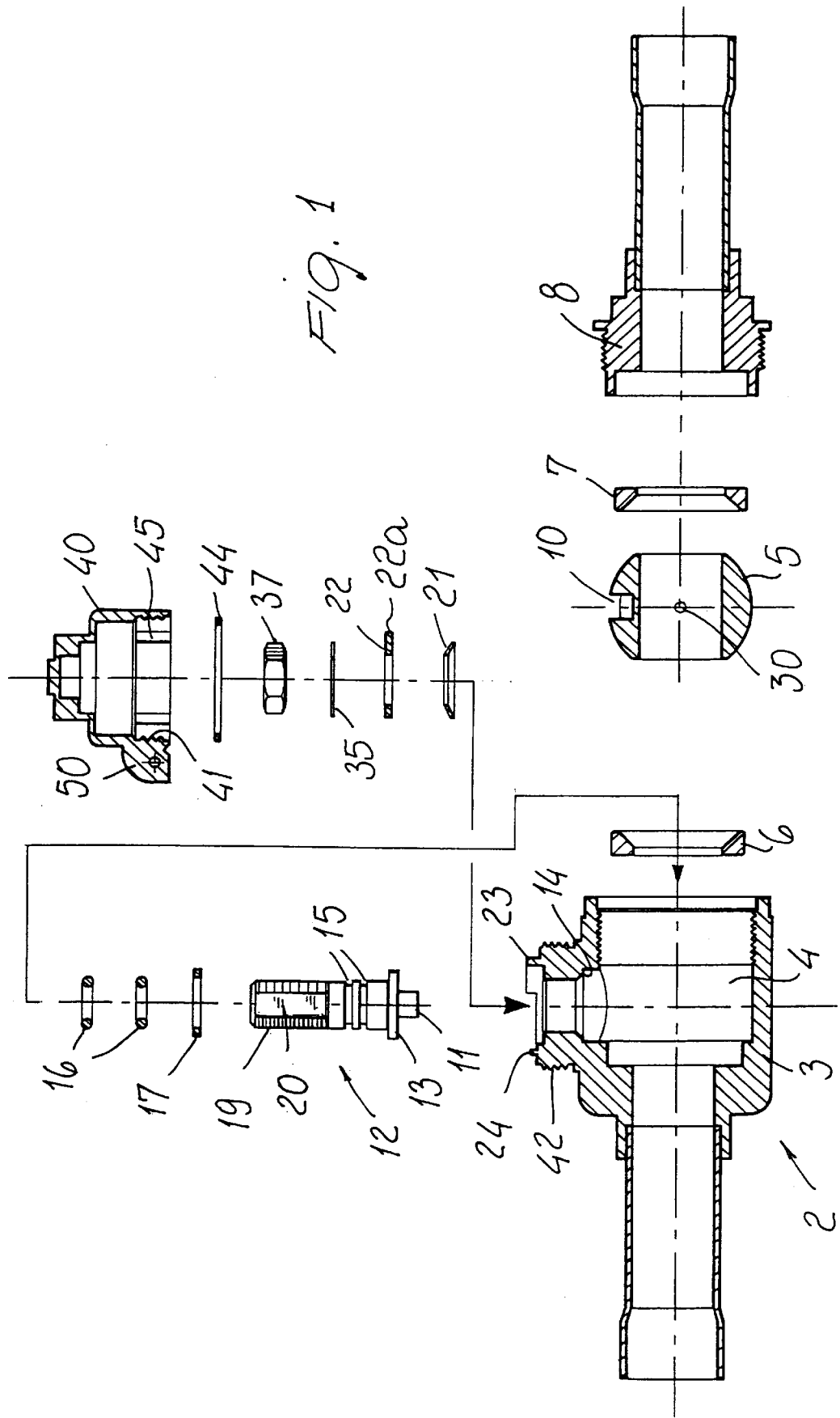

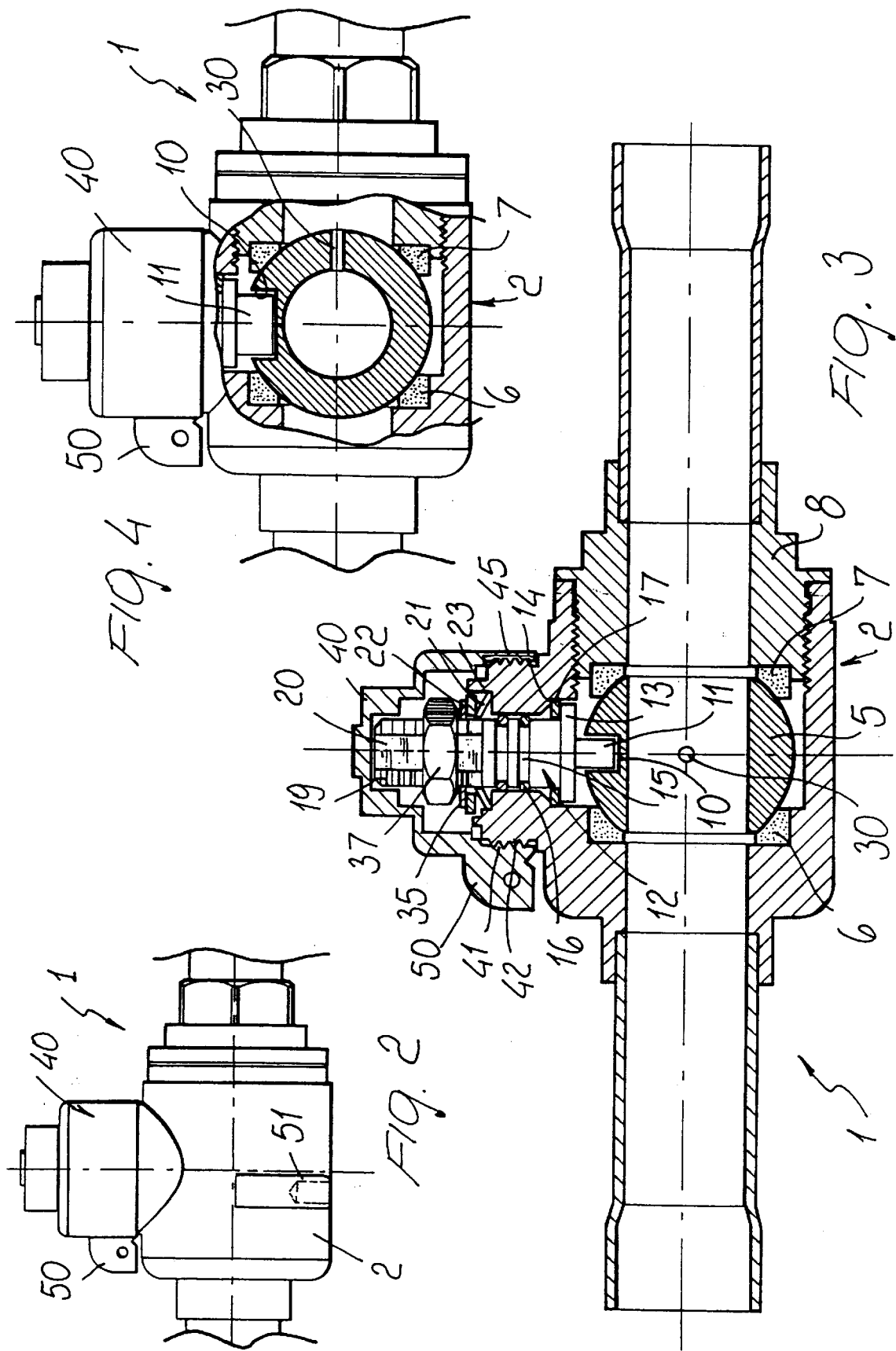

BIDIRECTIONAL BALL VALVE PARTICULARLY FOR ECOLOGICAL FRIGORIFIC GASES

FIELD OF THE INVENTION

The present invention relates to a bidirectional ball valve usable particularly for ecological frigorific gases.

BACKGROUND OF THE INVENTION

Ball valves currently present on the market can be used in frigorific circuits in which high-pressure fluids circulate.

A vent hole is usually provided an upper side of the valve so as to prevent high pressure in the ball, which may create problems when opening the valve.

Thus, with valves of this type it is not possible to immediately have an indication on the flow incoming direction, with the risk of operating on the part "under pressure", with the serious danger of injury for the operator and of certain environmental damage for the dispersion of the expensive frigorific gas into the air.

OBJECTS OF THE INVENTION

An object of the present invention is to provide a bidirectional ball valve usable particularly for ecological frigorific gases, which should allow simply and quickly carrying out the opening and closing operations by always providing a precise indication of the gas flow direction.

It is also an object to provide a bidirectional ball valve wherein the control rod is of the anti-ejection type and wherein the covering caps are structured so as to prevent the bursting of the closing cap during the unscrewing step caused by possible accidental gas leaks on the control rod.

Another object is to provide a bidirectional ball valve which provides the highest guarantees of reliability and safety of use.

Last but not least, yet another object of the present invention is that of providing a bidirectional ball valve which can be easily fabricated starting from elements and materials easy to find on the market.

SUMMARY OF THE INVENTION

These objects and others that shall better appear from the following description, are obtained with a bidirectional ball valve usable particularly for ecological frigorific gases, according to the invention, comprising a valve body housing a ball shutter connected to a control rod sealingly protruding from the valve body. The ball shutter is turnable by 180° and is provided with a through hole on the side surface, which in the closing step can be arranged in the incoming flow direction.

BRIEF DESCRIPTION OF THE DRAWING

Further features and advantages shall appear more clearly from the description of a preferred but not exclusive embodiment of a bidirectional ball valve, illustrated by way of the attached drawing. In the drawing:

FIG. 1 schematically shows an exploded section view of the bidirectional ball valve according to the invention;

FIG. 2 shows a side elevational view of the bidirectional ball valve;

FIG. 3 shows a sectional view of the ball valve with the section taken along longitudinal vertical plane;

FIG. 4 shows a partial plan view of the valve in closed position;

SPECIFIC DESCRIPTION

Figure 5:
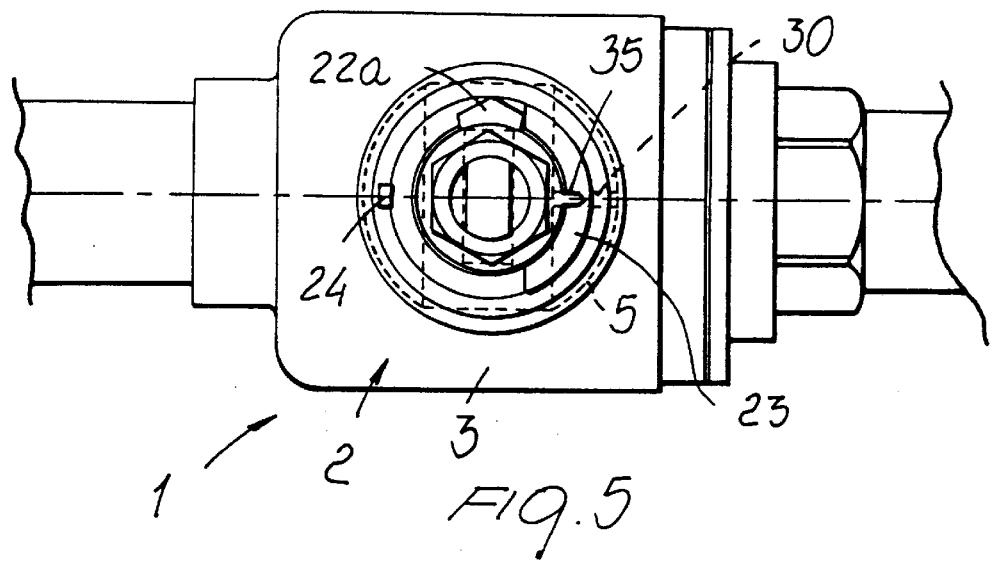
FIG. 5 schematically shows a plan view of the valve, in closed position, with a direction of the flow.
Figure 6:
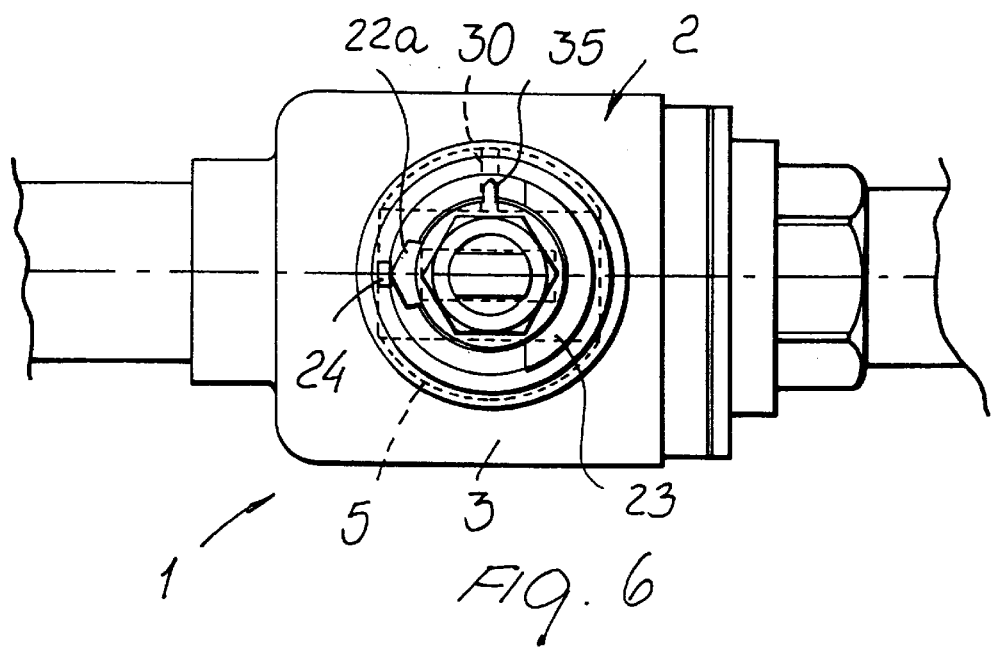
FIG. 6 schematically shows a plan view of the valve in open condition.
Figure 7:
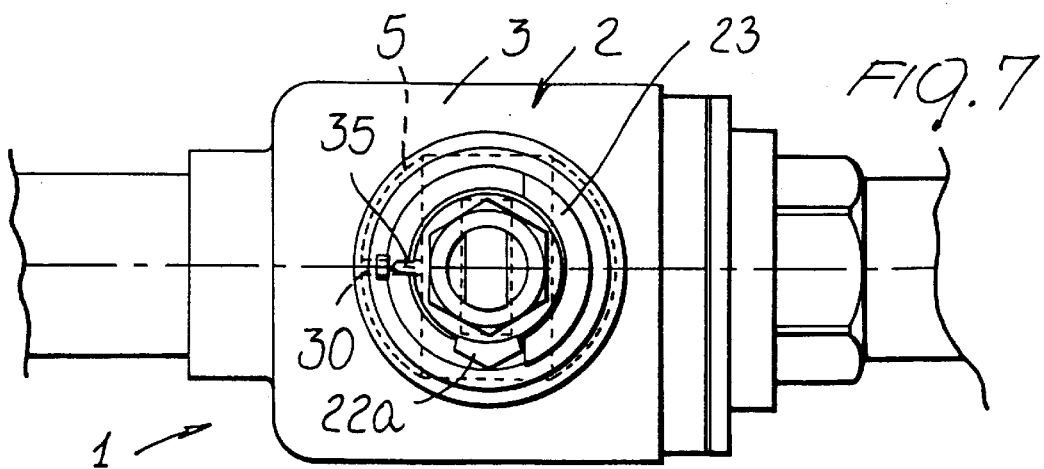
FIG. 7 schematically shows the valve in closed condition with a different flow direction.

With reference to the above figures, the bidirectional ball valve, usable particularly for ecological frigorific gases, which is collectively indicated with reference numeral 1, comprises a valve body 2 which inside defines a housing 4 for housing a ball shutter 5. The body 2 has a central portion 3.

The ball shutter bears against a first gasket 7, which is applied through a traditional screw 8 that connects to the valve body, for example through a laser weld that obtains a real fusion between body and screw, that is, without using material, thus guaranteeing a constant welding penetration and a seal of the frigorific gas.

Shutter 5 is provided, in an in se known manner, with an upper milling 10 into which the tang 11 of a control rod 12 engages. The control rod 12 is inserted from inside the valve body and is provided with a flange 13 that engages against an abutment 14 defined by the valve body.

The control rod 12 has housings 15 for o-rings 16 which sealingly operate, jointly with a plane gasket 17, which is superimposed to flanging 13.

The control rod exhibits a threaded portion 19 provided with a flattened portion 20.

Outside the valve body, there is provided a conic washer 21 above which there is superimposed a washer 22 indicating the opening of valve, which engages with the flattened portion 20 so as to be integral in rotation with the control rod.

Washer 22 has an arrow pointer 22a that can engage against an abutment 23 defined by the valve body, which realizes two different closing positions with a phase displacement of 180° with respect to one another, and precisely, of 90° on the right and 90° on the left with respect to the open and free flow position that is determined by a reference notch 24.

A peculiar feature of the invention, besides the possibility of carrying out the rotation of the ball shutter by 180°, is that the ball shutter exhibits a through hole 30 on its side surface, which in closed condition is available at the fluid passage pipes.

In the closed position of the valve, such through hole must be arranged in the flow incoming direction, so that the pressure entering into the ball collaborates to increasing the seal of the same ball, since it actually pushes it against one of gaskets 6 or 7.

It must be noted that if hole 30 were arranged at the opposed side, there would be a gas leak from the valve, since the thrust exerted by the fluid could create a blow-by on the upstream gasket, and as a consequence the blown-by fluid may exit from hole 30.

To make the operation of hole 30 clear, there is provided an arrow pointer 35, which is applied on the control rod, above pointer 22, so that its point indicates the position of hole 30, thus always showing the flow incoming direction to the operator, since the valve must be closed, thus positioning hole 30 towards the flow incoming direction.

It must be added to the above that there is provided a nut 37 for tightening washer 21, the positioning washer 22, as well as the arrow pointer 35.

The valve can be closed by a cap 40, which is provided with an inside thread 41 that engages with an outside thread 42 of the valve body, and which is provided with discharge outlets 45 on the threaded portion, allowing the venting of the possible gas under pressure that may have blown-by through the control rod.

The cap is provided with a sealing gasket 44 that operates against the valve body and, when the cap is unscrewed, the possible residual pressure into the cap is immediately released through discharge outlets 45, thus preventing the accidental "bursting" of the cap.

Moreover, the cap is provided with a perforated tongue 50 for the application of an optional lead seal or of a guarantee seal.

Moreover, the valve body 2 is provided with a base 51 with threaded housings for fastening that reduces the vibrations on the valve, which may damage the welding or create little cracks.

From the above description it can be seen that the invention achieves the described purpose and provided a bidirectional ball valve that is specifically usable for ecological frigorific gases which, having the possibility of rotating by 180°, allows adapting to any installation situation, and moreover, it allows immediately displaying the incoming direction of the fluid under pressure.

The invention thus conceived can be subject to several changes and variants, all falling within the scope of the inventive idea.

Moreover, all details can be replaced with other technically equivalent elements.

In the practice, the materials used as well as the relevant sizes and shapes can be of any type according to the requirements.

In the practice, the materials used as well as the relevant sizes and shapes can be of any type according to the requirements.

What is claimed is:

1. A bidirectional ball valve for frigorific gases, comprising:

a valve body having respective fittings connectable to pipes traversed by a frigorific gas, a housing formed in said valve body between said fittings, and respective seals in said housing having openings communicating with said fittings; and a ball shutter rotatable in said housing between an open position and a closed position, said ball shutter having a bore interconnecting said openings in said open position and forming an interior of said ball shutter, said ball shutter further having side surfaces on an exterior of said ball shutter closing said openings and engaging said seals in said closed position, said ball shutter being rotatable in said housing to dispose either of said side surfaces adjacent either of said seals in said closed position, one of said side surfaces having a single through hole extending from the exterior of said ball shutter to said interior of said ball shutter and adapted to be turned toward an inlet one of said fittings to communicate pressure from said inlet one of said fittings to said interior of said ball shutter and pressing said ball shutter against one of said seals.

2. The ball valve defined in claim 1, further comprising a control rod connected to said ball shutter for rotating same and an arrow pointer rotatable with said control rod and pointing in a direction in which said through hole is turned for displaying outside said valve and the flow incoming direction.

3. The ball valve defined in claim 2 wherein said control rod has a flange bearing against a plane sealing gasket sealing said control rod relative to said body, annular gaskets surrounding said control rod, said control rod having flattened portions for application of said arrow pointer.

4. The ball valve defined in claim 3, further comprising a covering gap for covering a portion of said control rod projecting from said valve body, said cap having a female thread engaging a male thread provided on said valve body.

5. The ball valve defined in claim 4, further comprising a gasket between said cap and said body, said female thread having discharge outlets for venting of gas pressure from within said cap.

6. The ball valve defined in claim 5, further comprising a tongue formed on said cap with a perforation for receiving a lead seal.

7. The ball valve defined in claim 6 wherein said body has a base with a thread for fastening of said valve to prevent movement of said body.

* * * * *